US009286180B1

(12) United States Patent
Musunuri et al.

(10) Patent No.: US 9,286,180 B1
(45) Date of Patent: Mar. 15, 2016

(54) FINAL RESULT CHECKING FOR SYSTEM WITH PRE-VERIFIED CORES

(71) Applicants: Aditya Musunuri, Austin, TX (US); Amol V. Bhinge, Austin, TX (US)

(72) Inventors: Aditya Musunuri, Austin, TX (US); Amol V. Bhinge, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 45 days.

(21) Appl. No.: 14/500,816

(22) Filed: Sep. 29, 2014

(51) Int. Cl.
*G06F 11/00* (2006.01)
*G06F 11/263* (2006.01)
*G06F 11/273* (2006.01)

(52) U.S. Cl.
CPC ............ *G06F 11/263* (2013.01); *G06F 11/273* (2013.01)

(58) Field of Classification Search
USPC ................................................. 714/45, 25, 2
See application file for complete search history.

(56) References Cited

U.S. PATENT DOCUMENTS

| 6,871,102 | B2 | 3/2005 | Jeong | |
|---|---|---|---|---|
| 2005/0220138 | A1* | 10/2005 | Barmettler | H04L 12/2697 370/465 |
| 2006/0036910 | A1* | 2/2006 | Fung | G06F 11/3672 714/25 |
| 2007/0033443 | A1* | 2/2007 | Tillmann | G06F 11/3684 714/45 |

OTHER PUBLICATIONS

Carlos Montemayor et al, "Multiprocessor Design Verification for the PowerPC 620 Microprocessor," IEEE International Conference on Computer Design, 1995; pp. 188-195; 8 pages.
D. L. Bird et al, "Automatic generation of random self-checking test cases," IBM Systems Journal, vol. 22, No. 3, 1983; pp. 229-245; 17 pages.
Jayanta Bhadra et al, "A Trace-Driven Validation Methodology for Multi-Processor SOCs," IEEE Internations System-on-Chip Conference, 2006, pp. 145-148; 4 pages.
Scott Glenn et al, "Functional Design Verification for the PowerPC 601 Microprocessor," IEEE VLSI Test Symposium, 1994, pp. 334-339; 6 pgs.

* cited by examiner

*Primary Examiner* — Sarai Butler
(74) *Attorney, Agent, or Firm* — Atesa Legal LLC

(57) ABSTRACT

Provided are a system and method for generating final result checking for a test case. A test case is executed for a coherent memory system having a processor core. An event log is generated for the processor core. The event log is analyzed. The test case for the core is annotated with a checker for performing expected data checking for physical addresses modified by the processor core.

20 Claims, 7 Drawing Sheets

US 9,286,180 B1

FINAL RESULT CHECKING FOR SYSTEM WITH PRE-VERIFIED CORES

FIELD

The present disclosure relates generally to chip level verification, and more specifically, to devices, systems, and methods for verifying memory coherency.

BACKGROUND

Modern integrated circuits typically include a set of modularized integrated circuit (IC) designs, or pre-verified cores, for a system-on-a-chip (SoC). A typical SOC includes multiple types of IC designs on a single semiconductor die. A typical SOC therefore includes complex data flows and multiple cores such as central processing units (CPUs), digital signal processors (DSPs), direct memory access (DMA), and peripherals. Chip development typically includes a verification phase for determining whether a design works as expected, including resource sharing. Accordingly, in a SoC design, functions of both the individual cores as they are developed and of the cores interconnected as a system must be verified.

During development of an IC processor, one or more test cases are provided that specify a set of initial values for the registers a set of instructions for the processor to execute. The processor is then simulated by a simulator, which simulates the processor's execution of instructions within each test case to verify correct operation of the processor.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

One challenge with verifying a SoC system is the lack of availability of reference models, or white-box checkers, which can result in expensive silicon re-spins. Even when available, white box checkers introduce substantial overhead. Conventional approaches do not provide a mechanism for generating checkers which are suitable for SoCs, especially with respect to achieving full coverage of the memory coherence aspects of the SoCs.

In brief overview, systems and methods according to embodiments of the present invention use event log data to generate final result checking, which is appended to system level verification test cases that are run on an SoC or related processor having one or more pre-verified cores. Information is acquired about instructions executed on a pre-verified core, which may result in a memory change transaction at the system. Using the information from the event logs as a reference, the memory contents at the end of a test stimulus can be compared and a pass/fail outcome can be generated. This information from the event logs is used to generate result checking in the system level verification test case having pre-verified cores. Accordingly, memory coherence verification is performed, while permitting the reuse of test cases on silicon. In particular, the same system level verification test cases having pre-verified cores, processors, or the like are annotated with final result checking. Accordingly, a final test suite can be reused on silicon to check functionally correct behavior, as described below.

Figure 1:
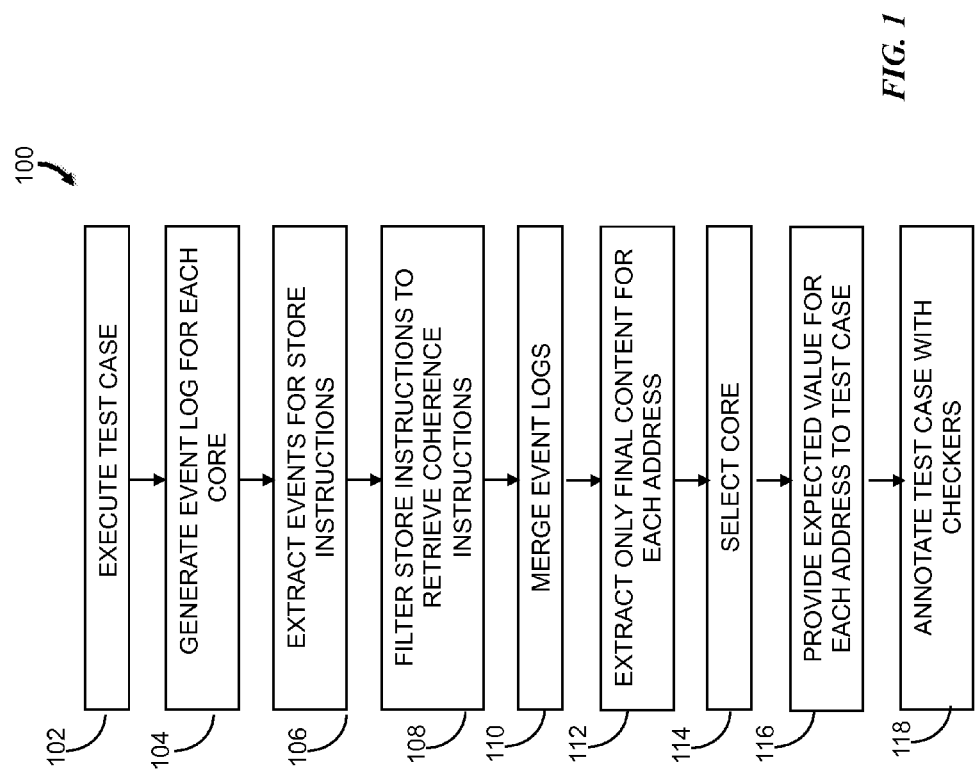
FIG. 1 is a flowchart of a method for auto-generating final result checkers and adding the final result checkers to a test case, in accordance with some embodiments.

FIG. 1 is a flowchart of a method 100 for auto-generating final result checkers and adding the checkers to a test case, in accordance with some embodiments.

At block 102, a test case is executed. The test case relates to one or more cores, and is executed a first time. In some embodiments, the test case is a system level verification test case, written in C or other programming language. In some embodiments, the test case is run at a silicon board. The test case can verify individual cores, and/or cores interconnected as a system. The test case is written in a format known to those of ordinary skill in the art, for example, a C program test case illustrated herein.

At block 104, an event log is generated for each core, for example, for each of a plurality of processes related to the core. The event log can be generated according to a well-known technique, such as management software for processor core event logs. Accordingly, information of all instructions executed by a core is included in an event log. The instruction information from the event logs for all cores can be collected for analysis. The collected information related to a given core preferably includes information about instructions executed at the core resulting in a memory change transaction, or event data according to a type of instruction. The instruction information collected from each event log record can include but is not limited to a timestamp, physical address, core index, and cluster index, memory content corresponding to the physical address, and the like. As described herein, the information in the event logs can be subsequently filtered to extract the instructions resulting in a memory change.

At block 106, each event log is searched for store instructions. All types of store instructions can be identified and retrieved from the search.

At block 108, each event log is filtered to extract information regarding coherence instructions along with a corresponding timestamp. The filtered information preferably pertains to only a coherent memory region.

At block 110, the event log records corresponding to the memory cores are merged, for example, by the verification system, to form a unified database of event logs.

At block 112, the unified database of event logs is sorted so that the final memory contents are extracted for each address.

At the end of database processing, the unified database of event logs includes the final contents of each unique address location in the main memory, in particular, relevant timestamps, addresses, and final corresponding information regarding memory change instructions or the like, for example, store instructions. A second sort can be performed for selecting the core, which is used to perform the result checking.

At block 114, the core is selected of the one or more cores from data of the sorted database. The selected core is used to aster expected data checking.

At block 116, an expected value for each memory address is provided to the test case for the selected core. The database includes information related to the selected core. For example, the information can include one or more hashes to map a key, address, or the like to an expected data value. The expected data value can be annotated to the test case.

At block 118, the test case for the selected core is annotated with generated checkers. In particular, a checker is added to the test case for performing expected data checking for some or all physical addresses modified by the identified processor cores. For each entry in the database, the test case can be annotated with a read/compare checker. In this example, this includes the reading of 1 byte from the physical address, checking for expected data, and asserting a dedicated pin using a general purpose input/output (GPIO) for fails. By annotating a test case with newly generated event checkers in this manner, during or after a first simulation run, the test case be performed on a software release, for example, any new register transfer level (RTL) logic release, or performed on silicon.

Figure 2:
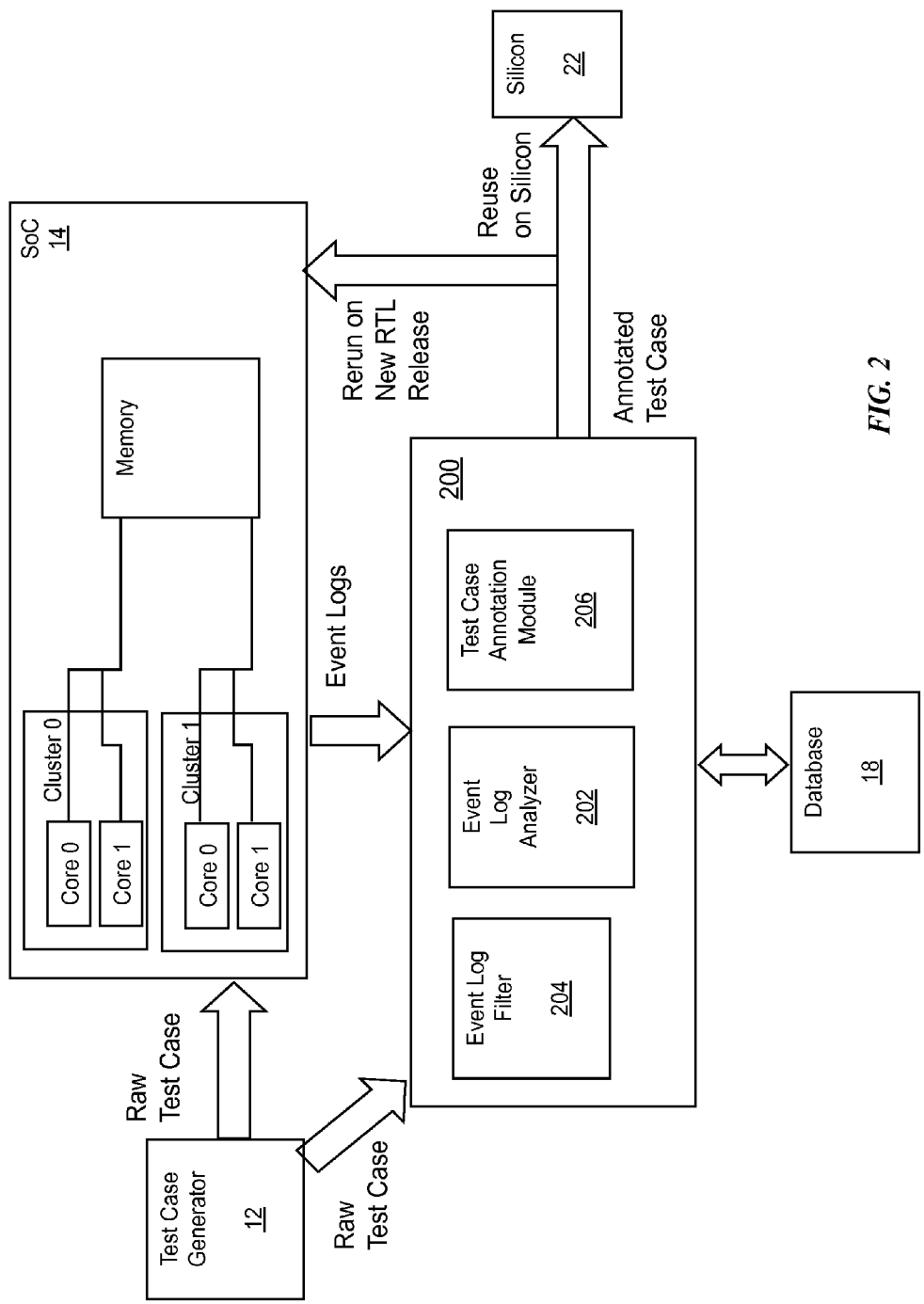
FIG. 2 is a block diagram of elements of a system-on-chip (SoC) verification system, in accordance with some embodiments.

FIG. 2 is a block diagram of elements of a system-on-chip (SoC) verification system 200, in accordance with some embodiments. Aspects of the system 200 may take the form of an entirely hardware embodiment, an entirely software embodiment (including firmware, resident software, microcode, etc.) or an embodiment combining software and hardware aspects. The SoC verification system 200 includes an event log analyzer 202, an event log filter 204 and a test case annotation module 206. A test case generator 200 outputs one or more test cases corresponding to a core to both the verification system 200 and an SoC 14. The SoC 14 includes one or more cores which can be organized into one or more clusters, as is known to those of ordinary skill in the art.

As discussed above, the SoC 14 generates an event log in response to receiving the test case that corresponds to the processor core and outputs the event log for processing by the verification system 200. The event log filter 204 searches the event log for store instructions or related memory change instructions and filters the received event log so that the event log analyzer 202 can extract information regarding coherence instructions along with a corresponding timestamp.

The test case annotation module 206 annotates the test case with a checker, for example, a read/compare checker. A result checking operation can be performed, and inserted for the addresses in the database 18. The selected core is used to master the expected result checking, for example, reading from each address and for performing a comparison against the expected value from the database, for example, to determine whether the design functions as expected. By annotating a test case with newly generated event checkers at the end, the test case will be run on any new RTL logic release. The same test case which is annotated with the final result checking can be re-used on silicon to check functionally correct behavior or related action.

Figure 3:
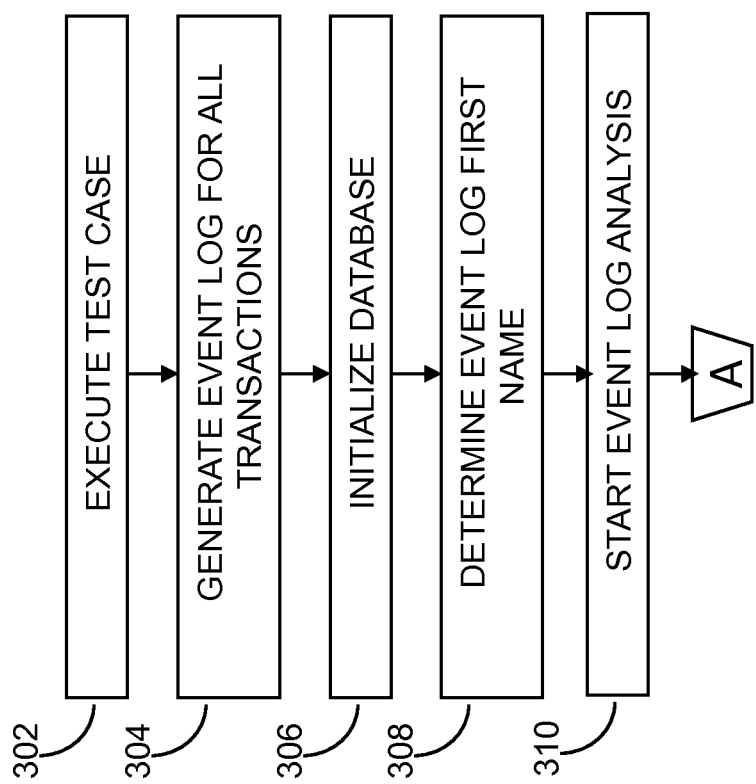
FIG. 3 is a flowchart of a method for preparing a system-on-chip (SoC) verification system for event log analysis, in accordance with some embodiments.

FIG. 3 is a flowchart of a method for preparing a system-on-chip (SoC) verification system for event log (elog) analysis, in accordance with some embodiments. Some or all of the method can be implemented in the SoC verification system of FIG. 2.

At block 302, a test case related to a core is executed a first time. In some embodiments, the test case is a system level verification test case, written in C or other programming language. In some embodiments, the test case is run at a silicon board. The test case can verify individual cores, and/or cores interconnected as a system. The test case is written in a format known to those of ordinary skill in the art, for example, a C program test case.

At block 304, an event log is generated for all transactions or operations performed by the core. Information such as timestamps, physical address, data contents such as updated memory content corresponding to the physical address, core index number, and/or core cluster index numbers can be provided, which is arranged in records or other predetermined format. The core and cluster numbers are relevant for associating cores with transactions that may be used to perform result checking. In other words, the cluster and core indices are required to determine which core executed the last transaction so that the core can be used for performing the result checking. The data content is a field in the database where the expected data is stored for subsequent checking.

At block 306, the database is initialized with the event log contents. For example, the database can be stored with a hash table, or populated with timestamp, address, data, core index, and cluster index fields for each received event log.

At block 308, the event log first name is determined, for example, to determine whether an event log file of a particular core exists, which provides information on whether that cluster index/core index exists in a multi-core system.

At block 310, an event log analysis is initiated.

Figure 4:
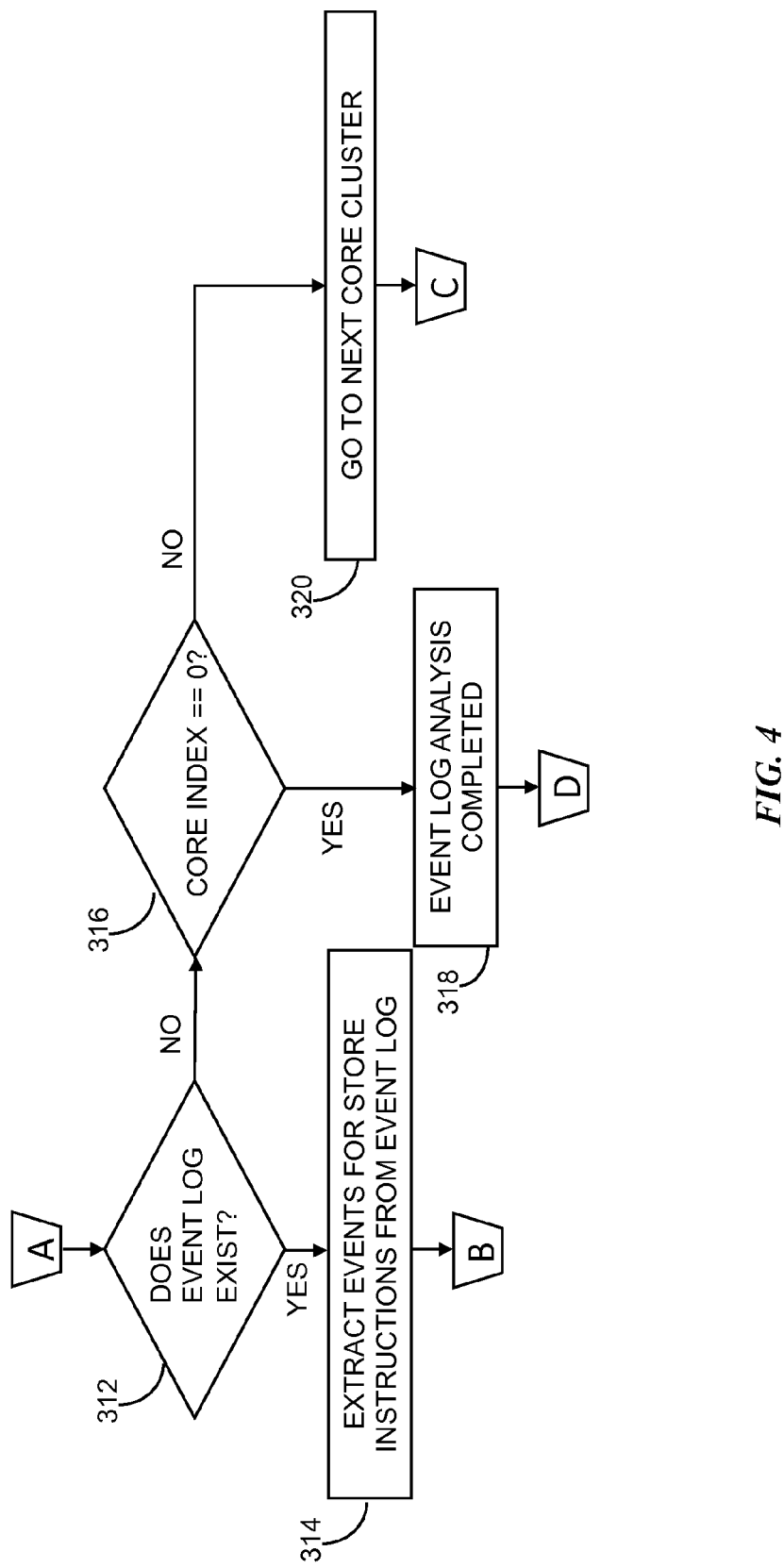
FIG. 4 is a continuation of the flowchart of FIG. 3, and includes a method for performing an event log analysis, in accordance with some embodiments.

FIG. 4 is a continuation of the flowchart of FIG. 3, and includes a method for performing an event log analysis, in accordance with some embodiments. Some or all of the method can be implemented in the SoC verification system of FIG. 2.

As described above with respect to FIG. 3, at block 310, an event log analysis is initiated after an event log is generated for a given core and a database is initialized. At decision diamond 312, a determination is made whether an event log exists for the given core and cluster according to the core and cluster indices as arranged in the database. If the event log is present, then the method proceeds to block 314, where events for all types of store instructions are extracted from the event log. For example, "stw" refers to a store word which writes 4 bytes of data, "std" refers to a store double which writes 8 bytes of data, "stb" refers to a 1 byte store, and so on.

If at decision diamond 312 a determination is made that the event log is not present, then the method proceeds to decision diamond 316, where a determination is made whether the core index equals 0. If the core index equals 0, this indicates that an event log analysis for the cores of all current core clusters is completed, and the method proceeds to block 318. Otherwise, the method proceeds to a next core cluster (block 320), where the event log analysis proceeds with a next core cluster step is performed.

Figure 5:
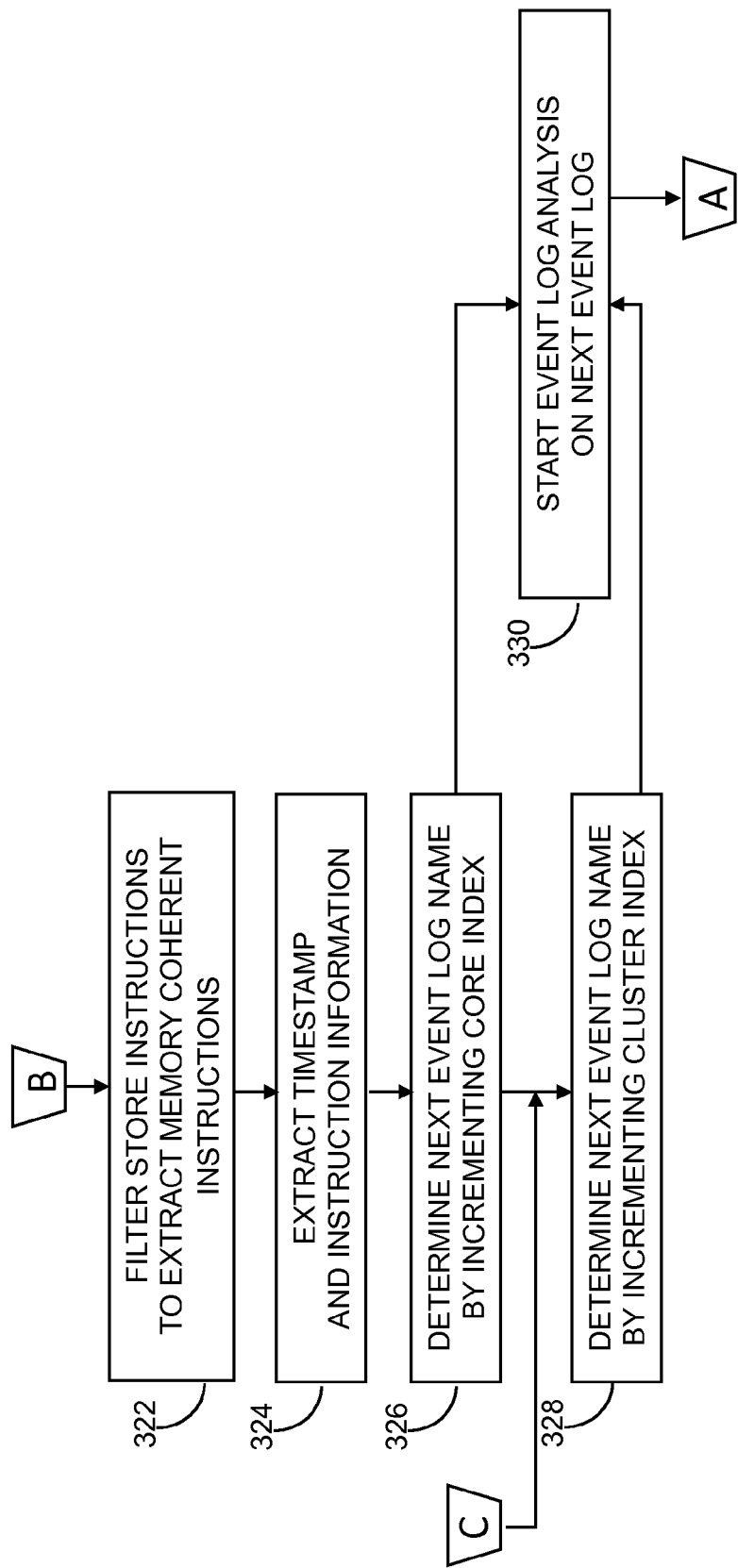
FIG. 5 is a continuation of the flowchart of FIGS. 3 and 4, and includes a continuation of the method for performing an event log analysis of FIG. 4, in accordance with some embodiments.

FIG. 5 is a continuation of the flowchart of FIGS. 3 and 4, and more specifically includes a continuation of the method for performing an event log analysis of FIG. 4 if the event log exists, in accordance with some embodiments. Some or all of the method can be implemented in the SoC verification system of FIG. 2.

At block 322, the store instructions of block 314 are filtered to retrieve only the transactions corresponding to the coherent memory region. Information about the instructions is executed on the core which would result in a change in the memory content, such information including address and data pairs for use during a subsequent a final result checking annotation step described herein.

An example of an entry in the event log file is:

ST 00008000 12345678 . . . S:0000008000/0 SO

Accordingly, each entry in the event log can correspond to a bigger data size. In the above example it is 4 bytes of data. When storing this in the database, the data can be divided into single bytes or other smaller size data so that when a transaction from one core collides with a transaction from another core, the collision can be of any size. The database is therefore preferably maintained with the least memory granule, so that the content for each unique address can be identified.

At block 324, the timestamp is extracted along with the information regarding the memory change instructions, such as physical address, data, core_index, and cluster_index for each byte.

At block 326, a next event log name is determined by incrementing the core index. At block 328, a next event log name is determined by incrementing the cluster index when the core index is 0.

At block 330, an event log analysis is performed on the next core, for example, according to the method illustrated at FIG. 4. The next core can corresponding to a current core cluster or a next core cluster.

Figure 6:
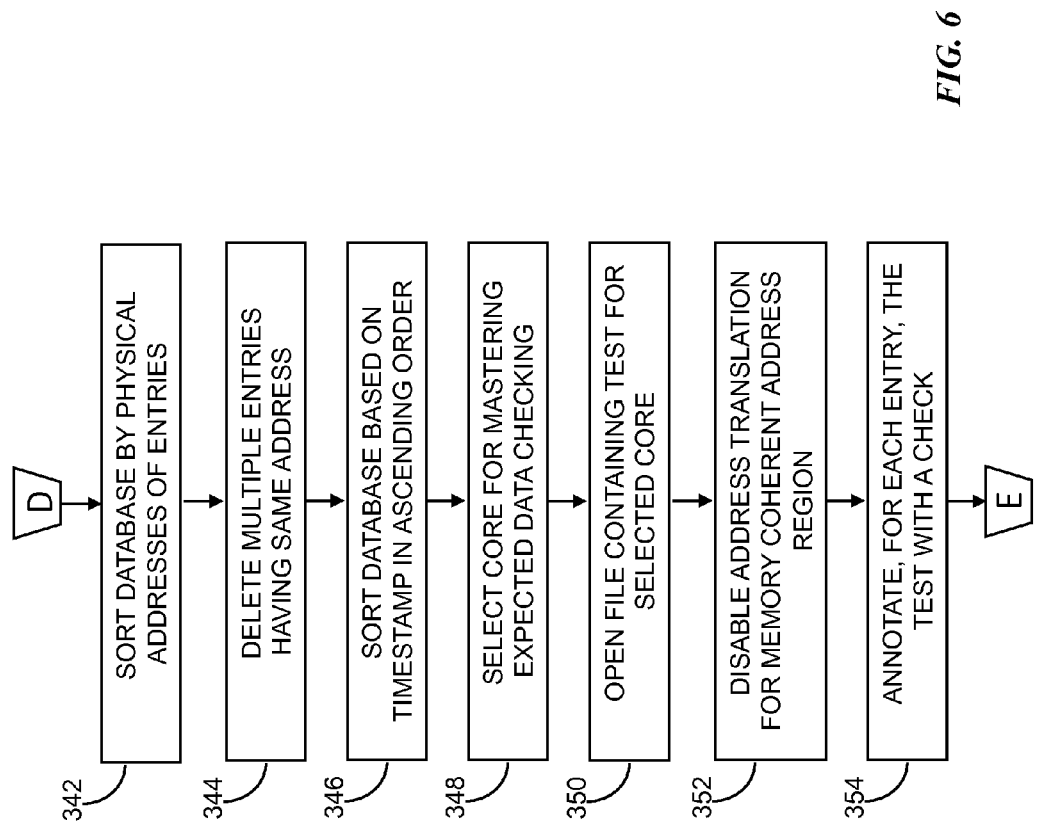
FIG. 6 is a continuation of the flowchart of FIGS. 3-5, including a method for processing a database for annotating a core, in accordance with some embodiments.

FIG. 6 is a continuation of the flowchart of FIGS. 3-5, including a method for processing a database for annotating a core, in accordance with some embodiments. Some or all of the method can be implemented in the SoC verification system of FIG. 2. After the event log analysis is completed (connector D) on the cores and clusters of the system, at least two filtering steps are performed at the database. The first filtering step is at block 342, where the database is sorted according to the physical addresses of entries. In preferred embodiments, the physical addresses are sorted in ascending order. The physical addresses stored in the database can correspond to memory addresses in a system memory or the like.

At block 344, multiple entries having the same physical address are deleted. In doing so, the entry with the most recent timestamp remains stored at the database. Blocks 342 and 344 relate to processing the database to extract final results, as described herein.

At block 346, the database is sorted again, except based on timestamp in ascending order, i.e., from the oldest timestamp to the most recent timestamp.

At block 348, the core having a transaction with the most recent timestamp is selected for reading the memory contents and for performing the final result checking for all physical addresses that have been modified by the cores. The core is selected based on the analysis of the event logs, for example, described herein. The selected core is used to master or otherwise perform the expected result checking, for example, reading from each address and for performing a comparison against the expected value from the database, for example, to determine whether the design functions as expected. With regard to the most recent transaction, the core is selected which was the last one in terms of completing an instruction, transaction, or the like. As described herein, the most recent transaction is determined for selecting the core for final result checking. Core selection is achieved in this manner to ensure that all transactions are completed at the time of final result checking. Otherwise, final result checking may fail.

At block 350, a file is opened which includes a test for the selected core. The file may be written in the C programming language, but is not limited thereto.

At block 352, address translation for the coherent memory address region is disabled for matching the physical address of the main memory, so that the core addresses directly correspond to the system memory addresses. Accordingly, a list of instructions, for example, load, compare, and so on, are provided for each address to performing a check operation.

At block 354, the test case is annotated with the newly generated checker. For each entry in the database, the test case can be annotated with a checker, for example, a read/compare checker. A result checking operation includes reading from the memory physical address, comparing this with the expected value obtained from the database, and asserting a particular pin, for example, a dedicated GPIO pin in case of a mismatch and trigger error condition in the verification test bench. Result checking is preferably inserted for all the addresses in the database. By annotating a test case with newly generated event checkers at the end, after a first simulation run, the test case now be run on any new RTL logic release, for example, shown in FIG. 2. Alternatively, the annotated test case permits reuse on silicon 22, for example, shown in FIG. 2.

Figure 7:
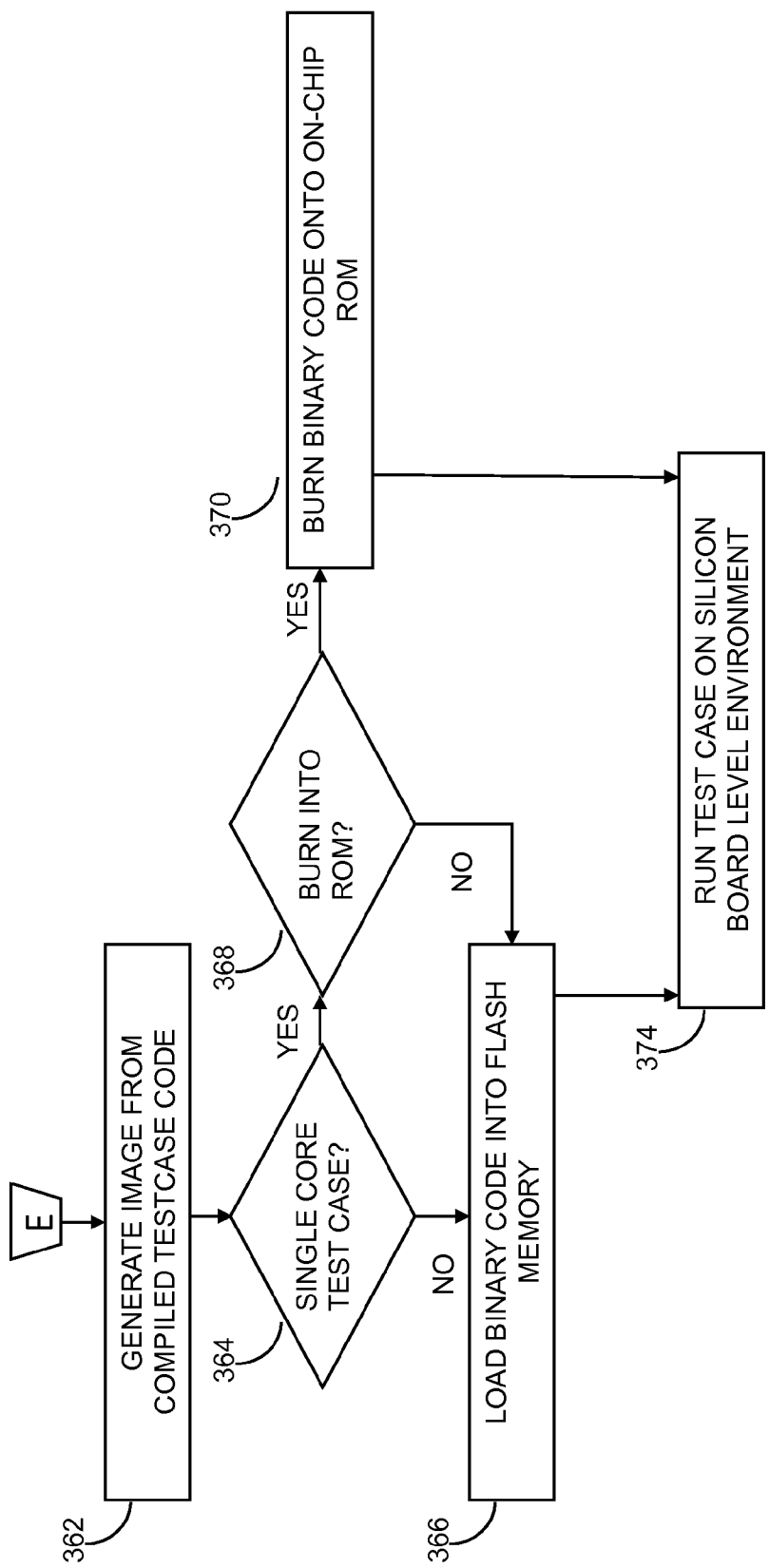
FIG. 7 is a continuation of the flowchart of FIGS. 3-6, including a method for executing a test case, in accordance with some embodiments.

FIG. 7 is a continuation of the flowchart of FIGS. 3-6, including a method for executing a test case, in accordance with some embodiments. Some or all of the method can be implemented in the SoC verification system of FIG. 2. After result checking is inserted for all addresses in the database (at connector E), the method can proceed to block 362, where the test case code is compiled. An image is generated from the compiled test case code, for example, generated in binary code.

At decision diamond 364, a determination is made whether the test case is a single core test case. If no, then at block 366, the binary code can be loaded into flash memory or the like, and at block 374, the test case can be run at a silicon board. If at decision diamond 364 a determination is made that the test case is a single core test case, then at decision diamond 368, a determination is made whether to burn the binary code of the single core test case into read only memory (ROM) or the like. If yes, then the method proceeds to block 370, where the binary code is burned into an on-chip ROM or the like, and at block 374, the test case can be run at a silicon board. If no, then the method proceeds to block 366, where the binary code is loaded into flash memory of the like, and at block 374, the test case can be run at a silicon board.

Accordingly, the method in accordance with some embodiments can be implemented to generate a large number of self-checking reusable test cases, for example, thousands of self-checking reusable C test cases, allowing code and functional coverage goals to be achieved. The systems and methods in accordance with embodiments also remove the dependency on core or processor reference models and can permit random test case generation to occur without reference models. The systems and methods herein can provide for an auto-generating of test cases for coherency verification, therefore improving the quality of pre-silicon verification, design implementations, and post-silicon validation.

For purposes of illustrating features of embodiments of the present invention, an example of a conventional C test case is shown as follows:

main( )
{
write32(DDR_BASE_ADDR, 0x12345678);
ddr_read_data=read32(DDR_BASE_ADDR);
compare32(ddr_read_data, 0x88776655);
write16(DDR_BASE_ADDR+0x4,0xA5A5);
ddr_read_data=read16(DDR_BASE_ADDR);
compare16(ddr_read_data, 0xA5A5);

```
write8(DDR_BASE_ADDR+0x8,0xA5);
ddr_read_data=read8(DDR_BASE_ADDR);
compare8(ddr_read_data, 0xA5);
write32(DDR_BASE_ADDR+0x100,0xDEADBEEF);
ddr_read_data=read32(DDR_BASE_ADDR);
compare32(ddr_read_data, 0xDEADBEEF);
}
```
The following is an example of a C test case:
```
main( )
{
write32(DDR_BASE_ADDR, 0x12345678);
write16(DDR_BASE_ADDR+0x4,0xA5A5);
write8(DDR_BASE_ADDR+0x8,0xDE);
write32(DDR_BASE_ADDR+0x100,0xDEADBEEF);
```
This C test case is annotated with event checkers, in accordance with embodiments of the present invention:
```
    ddr_read_data=read8(DDR_BASE_ADDR+0x0);   compare8(ddr_read_data, 0x12);
    ddr_read_data=read8(DDR_BASE_ADDR+0x1);   compare8(ddr_read_data, 0x34);
    ddr_read_data=read8(DDR_BASE_ADDR+0x2);   compare8(ddr_read_data, 0x56);
    ddr_read_data=read8(DDR_BASE_ADDR+0x3);   compare8(ddr_read_data, 0x78);
    ddr_read_data=read8(DDR_BASE_ADDR+0x4);   compare8(ddr_read_data, 0xA5);
    ddr_read_data=read8(DDR_BASE_ADDR+0x5);   compare8(ddr_read_data, 0xA5);
    ddr_read_data=read8(DDR_BASE_ADDR+0x8);   compare8(ddr_read_data, 0xDE);
    ddr_read_data=read8(DDR_BASE_ADDR+0x100);
       compare8(ddr_read_data, 0xDE);
    ddr_read_data=read8(DDR_BASE_ADDR+0x101);
       compare8(ddr_read_data, 0xAD);
    ddr_read_data=read8(DDR_BASE_ADDR+0x102);
       compare8(ddr_read_data, 0xBE);
    ddr_read_data=read8(DDR_BASE_ADDR+0x103);
       compare8(ddr_read_data, 0xEF);
}
```

As will be appreciated, embodiments as disclosed include at least the following. In one embodiment, a method is provided for generating final result checking for a test case. The method comprises executing a test case by a coherent memory system having a processor core; generating an event log for the processor core in response to executing the test case; filtering the event log to extract instruction information; generating a checker from the instruction information; annotating the test case with the checker for performing expected data checking for physical addresses modified by the processor core; and executing the annotated test case by the coherent memory system, including performing the expected data checking for the physical addresses modified by the processor core.

Alternative embodiments of the method can include one of the following features, or any combination thereof. The method further comprises performing a result checking operation comprising: reading by the checker a memory physical address in the event log; and comparing the contents corresponding to the memory physical address with an expected value from the event log to validate circuit design functionality. The method further comprises executing the annotated test case on a software release. The method further comprises executing the annotated test case on a register transfer level (RTL) logic release. The test case is a system level verification test case. The method further comprises executing the annotated test case on silicon. The event log comprises a plurality of event log records, each including a timestamp, a physical address, an updated memory content corresponding to the physical address, a core index, and a cluster index. The method further comprises filtering the event log, comprising: filtering collected information from the event log regarding memory change instructions. Analyzing the event log comprises filtering collected information pertaining to a coherent memory region. Analyzing the event log comprises: filtering redundant entries from the event log pertaining to a same physical address; and retaining an entry with a most recent timestamp. The processor core reads contents of a memory and performs final result checking for physical addresses modified by the processor core.

In another embodiment, a method for generating final result checking for a test case, comprises: executing a test case by a coherent memory system having a plurality of processor cores; generating an event log for each processor core in response to executing the test case; merging the event logs of the processor cores; filtering the event logs to extract memory change instruction information; selecting a processor core of the plurality of processor cores according to the merged event logs for performing the expected data checking; generating a checker from the event logs; annotating the test case with the checker for performing expected data checking for physical addresses modified by the selected processor core; and executing the annotated test case by the coherent memory system, including performing the expected data checking.

Alternative embodiments of the method can include one of the following features, or any combination thereof. The processor core of the plurality of processor cores is selected by sorting the database of event logs based on a timestamp to identify a core number of the processor core that initiated a most recent transaction. The selected processor core reads contents of a memory and performs final result checking for physical addresses modified by the plurality of processor cores.

In another embodiment, a verification system comprises a processor core that executes a test case for a coherent memory system; an event log analyzer that analyzes an event log generated for the processor core; and a test case annotation module that annotates the test case with a checker for performing expected data checking for physical addresses modified by the processor core.

Alternative embodiments of the verification system include one of the following features, or any combination thereof. An event log filter filters collected information from the event log to extract information regarding memory change instructions. The checker is generated in response to the analyzer analyzing the event log. The checker reads at least one physical address in the event log, and compares contents corresponding to the at least one physical address with an expected value in the event log. The coherent memory system has a plurality of processor cores. An event log is generated for each processor core. The verification system merges the event logs of the processor cores at a database and selects a processor core of the plurality of processor cores according to the merged event logs for performing the expected data checking. The annotated test case is executed on a register transfer level (RTL) logic release or silicon. The test case is loaded on an on-chip or flash memory for reuse on silicon.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for generating final result checking for a test case, comprising:
   executing a test case by a coherent memory system having a processor core;
   generating an event log for the processor core in response to executing the test case;
   filtering the event log to extract instruction information;
   generating a checker from the instruction information;
   annotating the test case with the checker for performing expected data checking for physical addresses modified by the processor core; and
   executing the annotated test case by the coherent memory system, including performing the expected data checking for the physical addresses modified by the processor core.

2. The method of claim 1, further comprising performing a result checking operation comprising:
   reading by the checker a memory physical address in the event log; and
   comparing the contents corresponding to the memory physical address with an expected value from the event log to validate circuit design functionality.

3. The method of claim 1, further comprising:
   executing the annotated test case on a software release.

4. The method of claim 1, further comprising:
   executing the annotated test case on a register transfer level (RTL) logic release.

5. The method of claim 1, wherein the test case is a system level verification test case.

6. The method of claim 1, further comprising:
   executing the annotated test case on silicon.

7. The method of claim 1, wherein the event log comprises a plurality of event log records, each including a timestamp, a physical address, an updated memory content corresponding to the physical address, a core index, and a cluster index.

8. The method of claim 1, further comprising filtering the event log, comprising:
   filtering the extracted instruction information includes memory change instructions.

9. The method of claim 1, wherein analyzing the event log comprises filtering the extracted information pertaining to a coherent memory region.

10. The method of claim 1, wherein analyzing the event log comprises:
    filtering redundant entries from the event log pertaining to a same physical address; and
    retaining an entry with a most recent timestamp.

11. The method of claim 1, wherein the processor core reads contents of a memory and performs final result checking for physical addresses modified by the processor core.

12. A method for generating final result checking for a test case, comprising:
    executing a test case by a coherent memory system having a plurality of processor cores;
    generating an event log for each processor core in response to executing the test case;
    merging the event logs of the processor cores;
    filtering the event logs to extract memory change instruction information;
    selecting a processor core of the plurality of processor cores according to the merged event logs for performing the expected data checking;
    generating a checker from the event logs;
    annotating the test case with the checker for performing expected data checking for physical addresses modified by the selected processor core; and
    executing the annotated test case by the coherent memory system, including performing the expected data checking.

13. The method of claim 12, wherein the processor core of the plurality of processor cores is selected by sorting the database of event logs based on a timestamp to identify a core number of the processor core that initiated a most recent transaction.

14. The method of claim 12, wherein the selected processor core reads contents of a memory and performs final result checking for physical addresses modified by the plurality of processor cores.

15. A verification system, comprising:
    a processor core that executes a test case for a coherent memory system;
    an event log analyzer that analyzes an event log generated for the processor core; and
    a test case annotation module that annotates the test case with a checker for performing expected data checking for physical addresses modified by the processor core.

16. The verification system of claim 15, wherein an event log filter filters collected information from the event log to extract information regarding memory change instructions.

17. The verification system of claim 15, wherein the checker is generated in response to the analyzer analyzing the event log, and wherein the checker reads at least one physical address in the event log, and compares contents corresponding to the at least one physical address with an expected value in the event log.

18. The verification system of claim 15, wherein the coherent memory system has a plurality of processor cores, wherein an event log is generated for each processor core, and wherein the verification system merges the event logs of the processor cores at a database; and selects a processor core of the plurality of processor cores according to the merged event logs for performing the expected data checking.

19. The verification system of claim 15, wherein the annotated test case is executed on a register transfer level (RTL) logic release or silicon.

20. The verification system of claim 15, wherein the test case is loaded on an on-chip or flash memory for reuse on silicon.

* * * * *